US012812348B2

(12) United States Patent
Japa et al.

(10) Patent No.: US 12,812,348 B2
(45) Date of Patent: Nov. 24, 2026

(54) ENABLING A HOME DEVICE TO OPERATE ON A WIRELESS TELECOMMUNICATION NETWORK AND INTERACT WITH A SECOND MOBILE DEVICE OPERATING ON THE NETWORK

(71) Applicant: T-Mobile USA, Inc., Bellevue, WA (US)

(72) Inventors: Chakravarthi Japa, Frisco, TX (US); Mallika S. Deshpande, Bellevue, WA (US); Mikhail Fridman, Leavenworth, WA (US); Veera Annapoorna Chitturi, Renton, WA (US); Prakasa Rao Bellam, Snohomish, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 362 days.

(21) Appl. No.: 18/407,272

(22) Filed: Jan. 8, 2024

(65) Prior Publication Data

US 2025/0227447 A1 Jul. 10, 2025

(51) Int. Cl.
*H04W 4/90* (2018.01)
*H04W 4/021* (2018.01)
*H04W 76/10* (2018.01)

(52) U.S. Cl.
CPC ............. *H04W 4/90* (2018.02); *H04W 4/021* (2013.01); *H04W 76/10* (2018.02)

(58) Field of Classification Search
CPC ......... H04W 4/90; H04W 4/02; H04W 4/021; H04W 76/00; H04W 76/10; H04W 76/11; H04W 76/12; H04W 76/15; H04W 76/19
See application file for complete search history.

(56) References Cited

U.S. PATENT DOCUMENTS

| | | | |
|---|---|---|---|
| 6,272,129 | B1 | 8/2001 | Dynarski et al. |
| 6,466,571 | B1 | 10/2002 | Dynarski et al. |
| 6,560,216 | B1 | 5/2003 | Mcniff et al. |
| 6,707,809 | B1 | 3/2004 | Warrier et al. |
| 6,912,230 | B1 | 6/2005 | Salkini et al. |
| 6,950,876 | B2 | 9/2005 | Bright et al. |

(Continued)

FOREIGN PATENT DOCUMENTS

| | | | | |
|---|---|---|---|---|
| CA | 2605102 | A1 * | 4/2008 | ............. H04L 12/66 |
| CN | 101669376 | A | 3/2010 | |

(Continued)

*Primary Examiner* — Siu M Lee

(74) *Attorney, Agent, or Firm* — Ashurst Perkins Coie US LLP

(57) ABSTRACT

The system obtains a unique identifier of a home device and a unique identifier of a first UE of a user. The system obtains a number of the first UE. The system maps the number to the unique identifier of the home device and to the unique identifier of the first UE. The system receives a request for a communication between the number of the first UE and a second UE. The system initiates a first connection between the home device associated with the number and a translation gateway of a network, and a second connection between the translation gateway and a multimedia subsystem of the network. The system enables the home device to operate on the network and interact with the second UE of the network by translating between different protocols used by the multimedia subsystem and the home device.

20 Claims, 16 Drawing Sheets

(56) References Cited

U.S. PATENT DOCUMENTS

| | | | |
|---|---|---|---|
| 6,970,443 B2 | 11/2005 | Dynarski et al. | |
| 7,525,987 B2 | 4/2009 | Ala-luukko | |
| 7,639,647 B2 | 12/2009 | Dantu et al. | |
| 7,738,489 B2 | 6/2010 | Tomar et al. | |
| 7,764,640 B2 | 7/2010 | Lee et al. | |
| 7,996,007 B2 | 8/2011 | Bantukul | |
| 8,054,165 B2 | 11/2011 | Gallagher et al. | |
| 8,055,790 B1 | 11/2011 | Bennett et al. | |
| 8,208,413 B1 | 6/2012 | Bienn et al. | |
| 8,218,462 B2 | 7/2012 | Ejzak et al. | |
| 8,250,634 B2 | 8/2012 | Agarwal et al. | |
| 8,305,983 B2 | 11/2012 | Siegel et al. | |
| 8,331,340 B2 | 12/2012 | Lazaridis et al. | |
| 8,345,666 B2 | 1/2013 | Clair et al. | |
| 8,402,165 B2 | 3/2013 | Deu-Ngoc et al. | |
| 8,462,679 B2 | 6/2013 | Buczek et al. | |
| 8,467,306 B2 | 6/2013 | Jana et al. | |
| 8,831,648 B2 | 9/2014 | Bantukul | |
| 9,232,386 B2 | 1/2016 | Mannepally | |
| 9,426,643 B2 | 8/2016 | Gaviria et al. | |
| 9,648,051 B2 | 5/2017 | Chaturvedi et al. | |
| 9,648,473 B1 | 5/2017 | Bertz et al. | |
| 9,674,233 B2 | 6/2017 | Efrati | |
| 9,697,542 B2 | 7/2017 | Qiu et al. | |
| 9,712,341 B2 | 7/2017 | Nas | |
| 9,769,646 B2 | 9/2017 | Mufti et al. | |
| 9,819,703 B2 | 11/2017 | Chiang | |
| 9,888,368 B1 | 2/2018 | Bertz et al. | |
| 9,942,285 B2 | 4/2018 | Lam et al. | |
| 9,967,347 B2 | 5/2018 | Bouthemy et al. | |
| 10,117,090 B2 | 10/2018 | Jahangir et al. | |
| 10,305,942 B2 | 5/2019 | Chiang | |
| 10,681,556 B2 | 6/2020 | Filart | |
| 11,297,513 B2 | 4/2022 | Agarwal et al. | |
| 2004/0196821 A1 | 10/2004 | Haddad et al. | |
| 2006/0245403 A1 | 11/2006 | Kumar | |
| 2007/0238472 A1 | 10/2007 | Wanless | |
| 2010/0075669 A1 | 3/2010 | Sparks et al. | |
| 2010/0080198 A1 | 4/2010 | Li | |
| 2010/0157986 A1 | 6/2010 | Rao et al. | |
| 2010/0177771 A1 | 7/2010 | Buckley et al. | |
| 2010/0246509 A1 | 9/2010 | Chen | |
| 2010/0265880 A1* | 10/2010 | Rautiola | H04L 61/35 370/328 |
| 2014/0269611 A1 | 9/2014 | Ionescu et al. | |
| 2016/0105468 A1* | 4/2016 | Mufti | H04L 65/80 709/228 |
| 2016/0255490 A1* | 9/2016 | Mufti | H04L 65/1073 370/328 |
| 2018/0176266 A1* | 6/2018 | Filart | H04L 65/80 |
| 2024/0179190 A1* | 5/2024 | Graves | H04M 3/5166 |
| 2024/0380793 A1* | 11/2024 | Badar | H04L 65/1104 |
| 2025/0227432 A1* | 7/2025 | Japa | H04W 4/90 |

FOREIGN PATENT DOCUMENTS

| | | | |
|---|---|---|---|
| CN | 108141440 | A | 6/2018 |
| CN | 105052201 | B | 3/2020 |
| CN | 110249605 | B | 4/2022 |
| EP | 1129585 | B1 | 6/2005 |
| EP | 2005680 | A1 | 12/2008 |
| EP | 2009866 | A1 | 12/2008 |
| EP | 1869841 | B1 | 12/2009 |
| EP | 2127406 | A1 | 12/2009 |
| EP | 2127409 | A1 | 12/2009 |
| EP | 2165501 | A1 | 3/2010 |
| EP | 2538633 | A1 | 12/2012 |
| EP | 3338432 | A1 | 6/2018 |
| EP | 2171981 | B1 | 8/2018 |
| EP | 2519065 | B1 | 8/2018 |
| EP | 2974450 | B1 | 8/2018 |
| EP | 2415230 | B1 | 12/2019 |
| EP | 3262816 | B1 | 5/2020 |
| JP | 4620099 | B2 | 11/2010 |
| JP | 2012523175 | A | 9/2012 |
| JP | 5323822 | B2 | 7/2013 |
| JP | 6661399 | B2 | 2/2020 |
| KR | 101185669 | B1 | 9/2012 |
| KR | 101203753 | B1 | 11/2012 |
| KR | 101661607 | B1 | 10/2016 |
| WO | 2006100459 | A2 | 9/2006 |
| WO | 2006100475 | A1 | 9/2006 |
| WO | 2006127417 | A1 | 11/2006 |
| WO | 2007112594 | A1 | 10/2007 |
| WO | 2008079337 | A2 | 7/2008 |
| WO | 2008088889 | A1 | 7/2008 |
| WO | 2008088890 | A1 | 7/2008 |
| WO | 2008154548 | A1 | 12/2008 |
| WO | 2009000886 | A1 | 12/2008 |
| WO | 2009092105 | A2 | 7/2009 |
| WO | 2010060087 | A2 | 5/2010 |
| WO | 2010115045 | A1 | 10/2010 |
| WO | 2012138107 | A2 | 10/2012 |
| WO | 2013144778 | A1 | 10/2013 |
| WO | 2014159166 | A1 | 10/2014 |
| WO | 2016138322 | A1 | 9/2016 |
| WO | 2017053218 | A1 | 3/2017 |
| WO | 2017172813 | A1 | 10/2017 |

* cited by examiner

ENABLING A HOME DEVICE TO OPERATE ON A WIRELESS TELECOMMUNICATION NETWORK AND INTERACT WITH A SECOND MOBILE DEVICE OPERATING ON THE NETWORK

BACKGROUND

A home device, such as Amazon Alexa or Google Home, is an electronic device installed inside a home and capable of natural language processing (NLP) for tasks such as interacting through voice commands, playing back music play, creating to-do lists, setting alarms, streaming podcasts, playing audiobooks, and providing weather, traffic, sports, and other real-time information and news. The home device can also control several smart devices as a home automation system.

BRIEF DESCRIPTION OF THE DRAWINGS

Detailed descriptions of implementations of the present invention will be described and explained through the use of the accompanying drawings.

Figure 1:
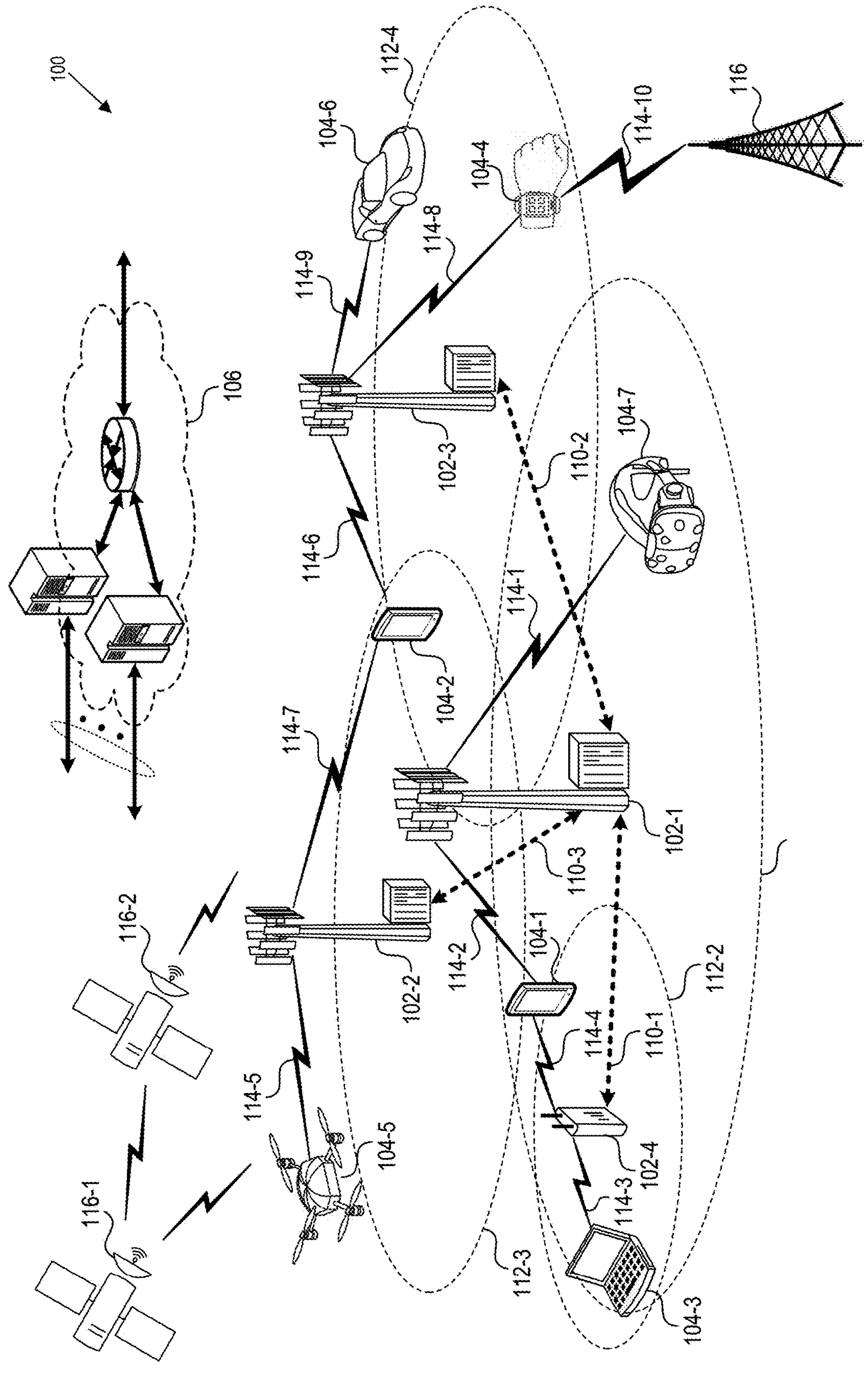
FIG. 1 is a block diagram that illustrates a wireless telecommunication network in which aspects of the disclosed technology are incorporated.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Disclosed here is a system and method to enable a home device to operate on a wireless telecommunication network and interact with a mobile device B associated with the wireless telecommunication network. The system obtains a unique identifier associated with the home device and a unique identifier associated with a mobile device A of a user. The system obtains a number associated with the mobile device A of the user, such as a phone number of the mobile device A. The system maps the number associated with the mobile device A to the unique identifier associated with the home device and to the unique identifier associated with the mobile device A.

The system receives a request for a communication between the number associated with the mobile device A and mobile device B. The system initiates a connection A between the home device associated with the number and a Web Real-Time Communication (webRTC) gateway associated with the wireless telecommunication network and a connection B between the webRTC gateway and an Internet Protocol Multimedia subsystem (IMS) core associated with the wireless telecommunication network.

The system enables the home device to operate on a wireless telecommunication network and interact with the mobile device B associated with the wireless telecommunication network by performing the following steps. First, the system receives a HyperText Transfer Protocol (HTTP) message through the connection A or a Session Initiation Protocol (SIP) message through the connection B. Second, the system translates the HTTP message into a particular SIP message prior to sending the particular SIP message to the IMS core. Alternatively, the system can translate the SIP message into a particular HTTP message prior to sending the particular HTTP message to the home device.

In addition, disclosed here is a system and method to enable a home device operating on a wireless telecommunication network to report a physical address of the home device in an emergency call. The system obtains multiple unique identifiers associated with multiple home devices, where the multiple unique identifiers include a unique identifier A associated with a home device A, a unique identifier B associated with a home device B, and a unique identifier associated with a mobile device of a user. The multiple home devices include the home device A and the home device B. The system obtains a number associated with the mobile device of the user, where the number enables the wireless telecommunication network to establish a call between the mobile device of the user and another mobile device operating on the wireless telecommunication network.

The system maps the number associated with the mobile device of the user to the unique identifier A associated with the home device A, to the unique identifier B associated with the home device B, and to the unique identifier associated with the mobile device of the user. Consequently, when a call is placed to the number associated with the mobile device, all of the devices including the home device A, the home device B, and the mobile device ring.

The system obtains a physical address A associated with the home device A, and a physical address B associated with the home device B, and generates multiple unique identifiers associated with multiple physical addresses. The multiple unique identifiers include a unique identifier A associated with the physical address A, and a unique identifier B associated with the physical address B.

The system stores the multiple unique identifiers and the multiple physical addresses in a database associated with the wireless telecommunication network, by mapping one physical address to one unique identifier. The system receives the emergency call from the home device among the multiple home devices and a unique identifier among the multiple unique identifiers. Based on the unique identifier, the system retrieves from the database the physical address associated with the home device placing the emergency call. Finally, the system provides the physical address to an emergency operator.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, internet protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service (QoS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

5G Core Network Functions

Figure 2:
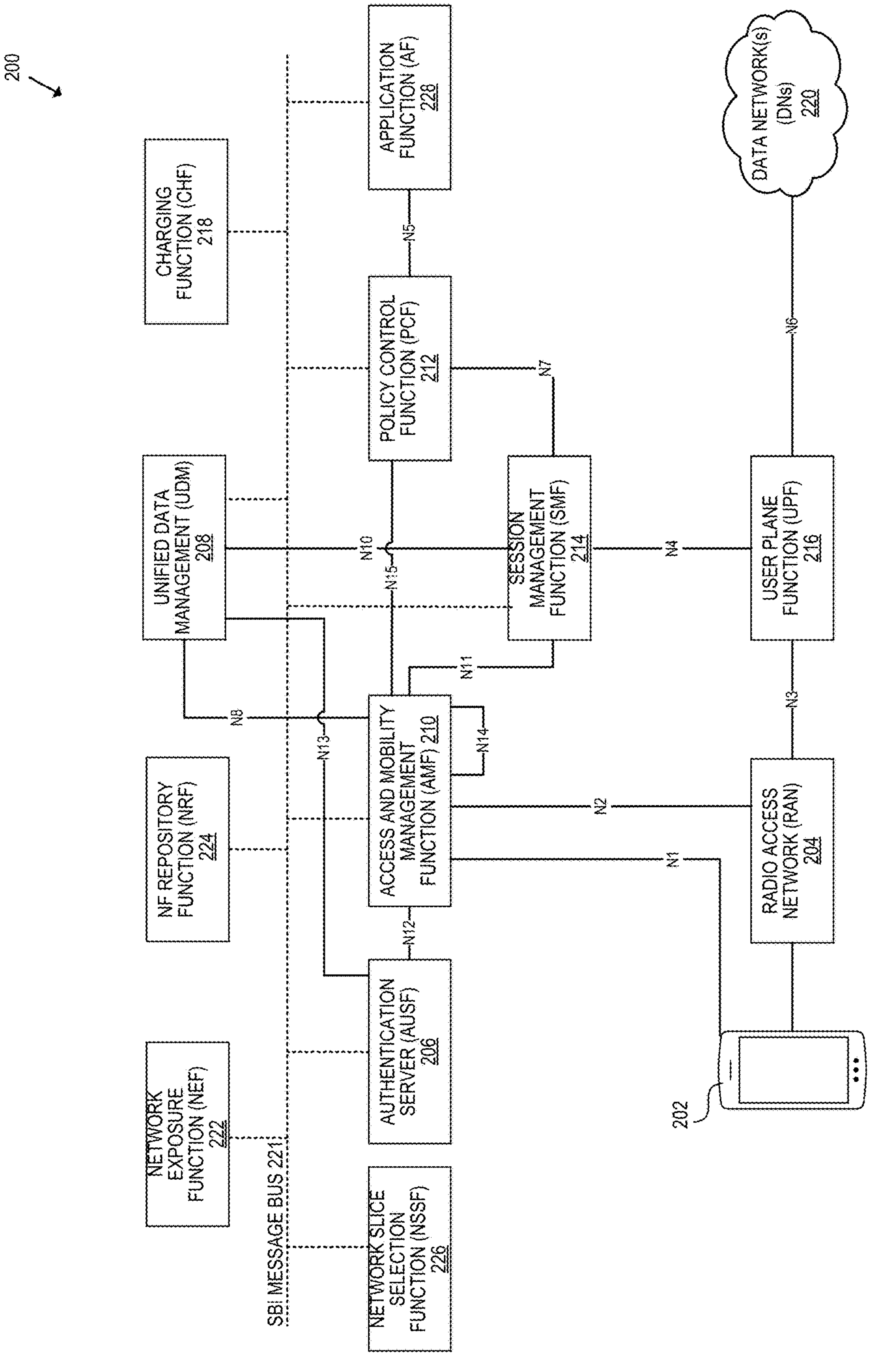
FIG. 2 is a block diagram that illustrates an architecture including 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, and service-level agreements and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS) and can provide authentication credentials while being employed by the AMF 210 and SMF 214 to retrieve subscriber data and context.

The PCF 212 can connect with one or more Application Functions (AFs) 228. The PCF 212 supports a unified policy framework within the 5G infrastructure for governing network behavior. The PCF 212 accesses the subscription information required to make policy decisions from the UDM 208 and then provides the appropriate policy rules to the control plane functions so that they can enforce them. The SCP (not shown) provides a highly distributed multi-access edge compute cloud environment and a single point of entry for a cluster of NFs once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework that, along with the more typical QoS and charging rules, includes network slice selection, which is regulated by the NSSF 226.

Figure 3:
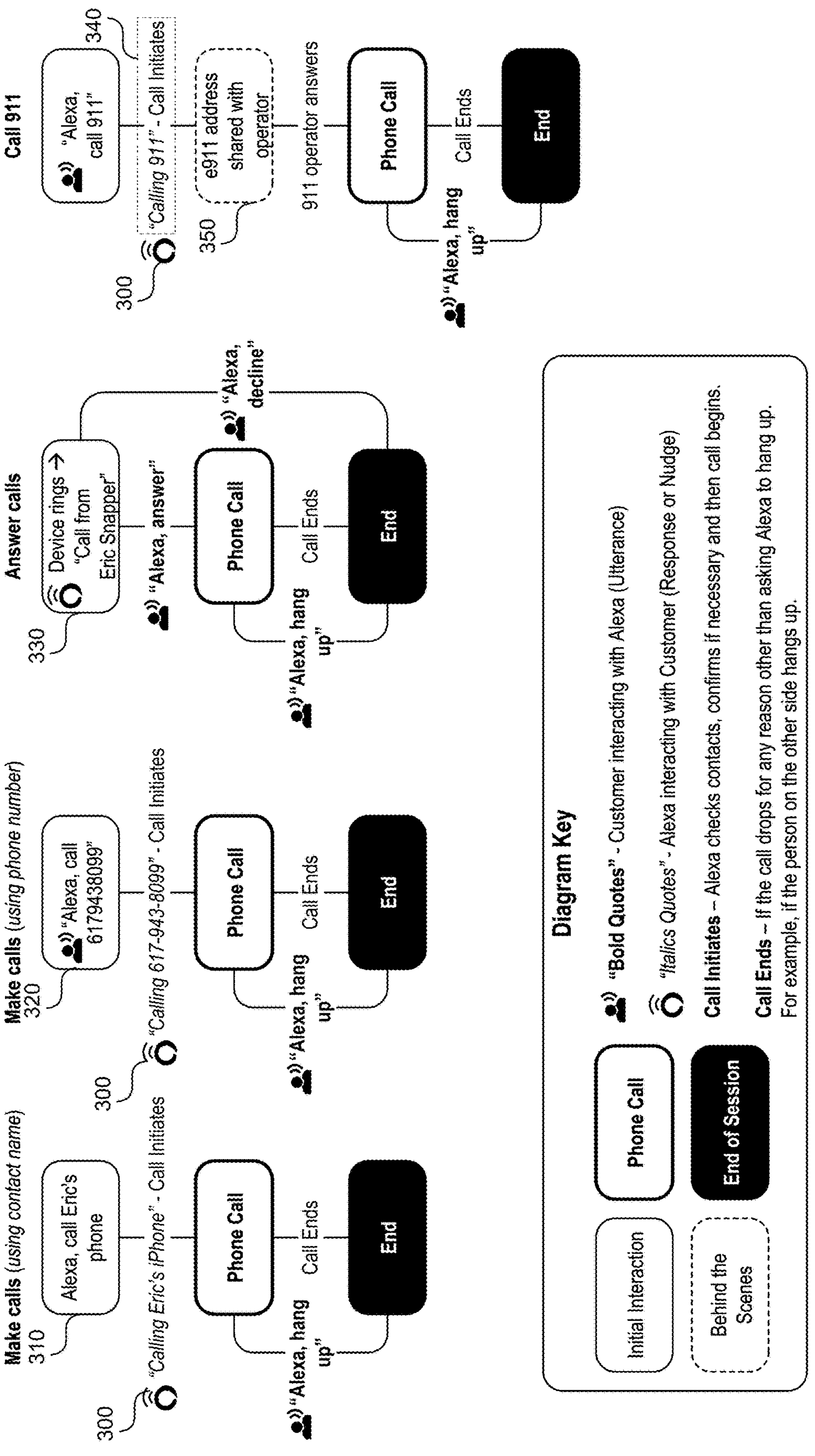
FIG. 3 shows various interactions between a home device and the network.

Enabling a Home Device to Operate on a Wireless Telecommunication Network and Interact with a Second Mobile Device Operating on the Network FIG. 3 shows various interactions between a home device and the network 100 in FIG. 1. The home device 300 can be Amazon Alexa, Google Home, or another device or software to set up, manage, automate, and control multiple compatible devices in a home. The user can interact with the home device 300 through voice commands. For example, in step 310, the user can instruct the home device 300 to "call Eric's phone," or in step 320, the user can instruct the home device to call a particular number such as 617-943-8099. In another example, in step 330, the home device 300 can receive a call from another UE operating on the network 100. In addition, in step 340, the home device 300 can place an emergency call, and in step 350, the home device 300 can share a physical address with an operator of the network 100, as described below. To end the call, the user can instruct the home device 300 to "hang up."

To perform the above operations, the network 100 maps an identifier, e.g., a number or a phone number, associated with a UE operating on the network to the home device 300. Consequently, two devices operating on the network 100, the home device 300 and the UE, have the same number. For example, to place the call to the appropriate UE operating on the network 100, the network indicates to the appropriate UE that the call is coming from the number associated with the UE operating on the network.

In another example, to receive the call, the network 100 receives an indication of a call placed to the number that is mapped to both the UE and the home device 300. The network 100 sends an instruction to both the UE and the home device 300 to give notification of the incoming call, for example, by ringing. Once the user answers the call on one of the devices, the network 100 sends an instruction to the other device to stop ringing.

To place the emergency call, e.g., a 911 call, the network 100 receives an indication of a physical address to associate with the home device 300. Once the network 100 receives a request for an emergency call coming from the home device 300, the network 100 provides the physical address to the emergency operator.

The network 100 can map multiple numbers to the home device 300. For example, the home device 300 can be mapped to the mom's, the dad's, and the child's phone numbers. When the network 100 receives a call to any of the mom's, the dad's, and/or the child's phone number, the network 100 can call the home device 300. When a call is being placed by the home device 300, the network 100 can receive an indication from the home device of which of the multiple numbers is placing the call. Specifically, the user can instruct the home device 300 to place a call from the mom's device.

To enable emergency calls when the home device 300 is associated with multiple numbers, each number can have the same or a different physical address associated with it. The home device 300 can have only a single number, e.g., the dad's phone number, mapped to it at any one time. When the home device 300 places the emergency call, the home device can provide the appropriate physical address associated with the single number mapped to the home device, e.g., the dad's physical address. If the user wants to provide a different physical address, the user needs to instruct the home device 300 to map to a different phone number, e.g., the child's phone number, and then place the emergency call. The network 100 can receive the physical address from the home device 300 in case of an emergency call.

Figure 4:
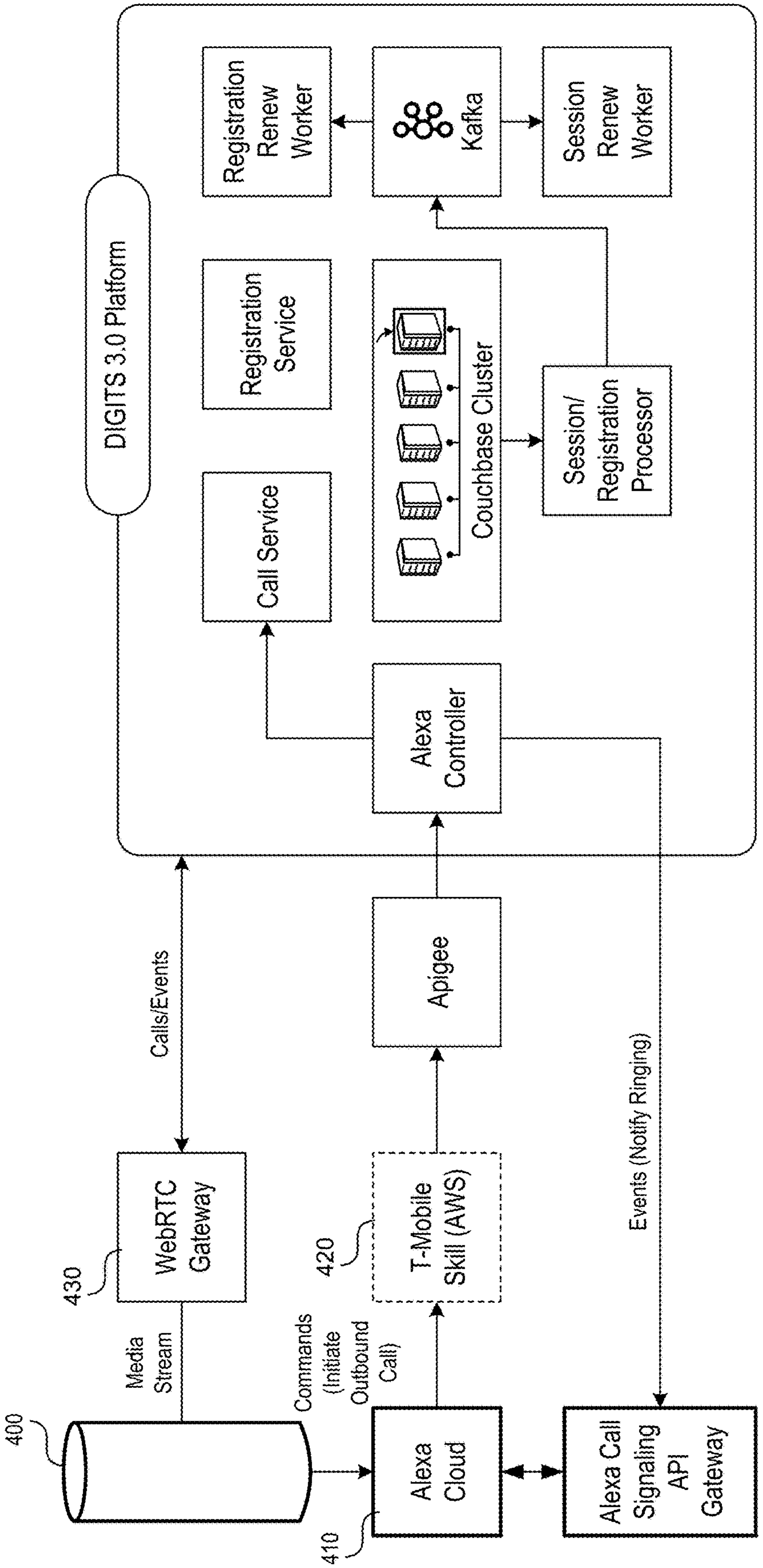
FIG. 4 shows a system to enable communication between a home device and a component of the network.

FIG. 4 shows a system to enable communication between a home device and a component of the network 100 in FIG. 1. The home device 400 can receive a voice instruction from a user, as described in this application, and pass the voice commands to a cloud module 410. To establish communication with the network 100, the application module 420, e.g., a skill, converts the incoming commands to a command that the network 100 can understand. The network 100 passes the commands to the webRTC gateway 430, which performs the necessary translation between the network 100 and the home device 400.

Figure 5:
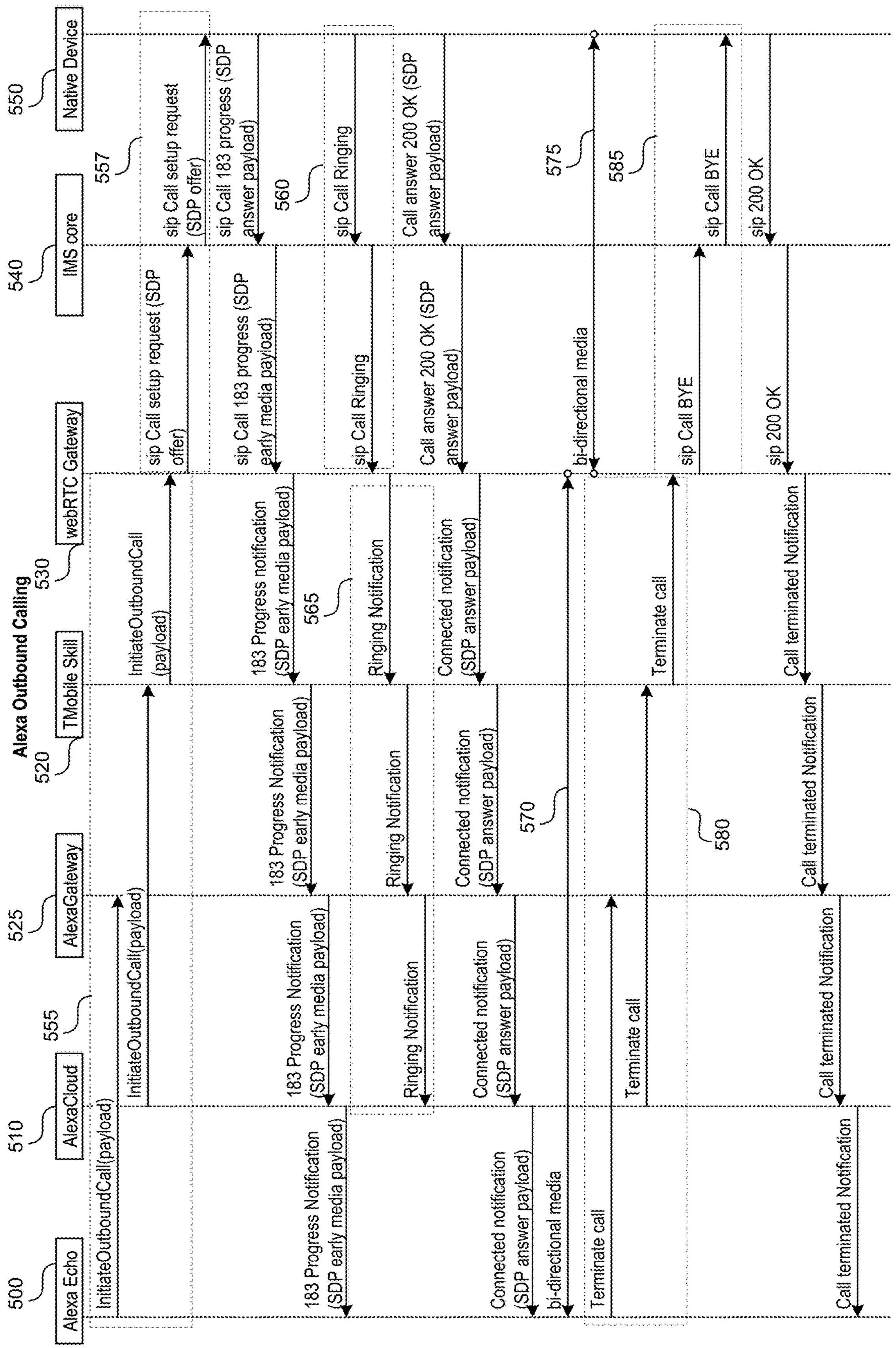
FIG. 5 shows a flow of commands to establish a call initiated by the home device to another UE on the network.

FIG. 5 shows a flow of commands to establish a call initiated by the home device to another UE on the network 100 in FIG. 1. The home device 500 can receive a voice instruction from a user to initiate a connection, e.g., a call, and can send a request to a cloud module 510 to initiate the connection. The cloud module 510 can send the request for the connection to the application module 520, which in turn forwards the request to the webRTC gateway 530. The communication between the home device 500, the cloud module 510, the application module 520, and the gateway 525 can be conducted using HyperText Transfer Protocol (HTTP).

The IMS core 540 is part of the network 100 and is a multimedia servers platform offering audio and video calls. The IMS core 540 communicates using Session Initiation Protocol (SIP) messages, and the webRTC gateway 530 acts as a bidirectional translator between the HTTP messages and the SIP messages used by the IMS core 540.

Once the IMS core 540 receives a SIP message from the webRTC gateway 530, the IMS core sends the SIP message to another UE 550. The UE 550 can be another mobile device, another home device, or any device operating on the network 100.

The webRTC gateway 530 receives SIP messages 555 establishing the connection and translates them into HTTP messages 557. The webRTC gateway 530 receives SIP messages 560 indicating that the UE 550 is ringing, and translates them into HTTP messages 565. The webRTC gateway 530 receives HTTP messages 570 bearing the communication between the home device 500 and the UE 550, and translates them into SIP messages 575. The webRTC gateway 530 receives HTTP messages 580 terminating the connection, and translates them into SIP messages 585.

In addition, the webRTC gateway 530 can transcode between an audio codec used by the IMS core 540, and a different audio codec used by the Representational State Transfer (REST)-based client such as the home device 500, the cloud module 510, the application module 520, and the gateway 525. A codec can encode and decode an audio, or compress and decompress the audio.

The webRTC gateway 530 plays an important role because it enables REST-based clients communicating using HTTP to interface with the network 100. Most developers are familiar with developing REST-based clients, as opposed to developing systems producing SIP messages. Consequently, the webRTC gateway 530 provides access to a wide number of already existing functionalities, or functionalities to be developed in the future that are not developed with a wireless telecommunication network interface in mind. Effectively, the webRTC gateway 530 creates a network as a service model to REST-based clients by providing access to the network 100 through translating between HTTP and SIP messages.

Figure 6:
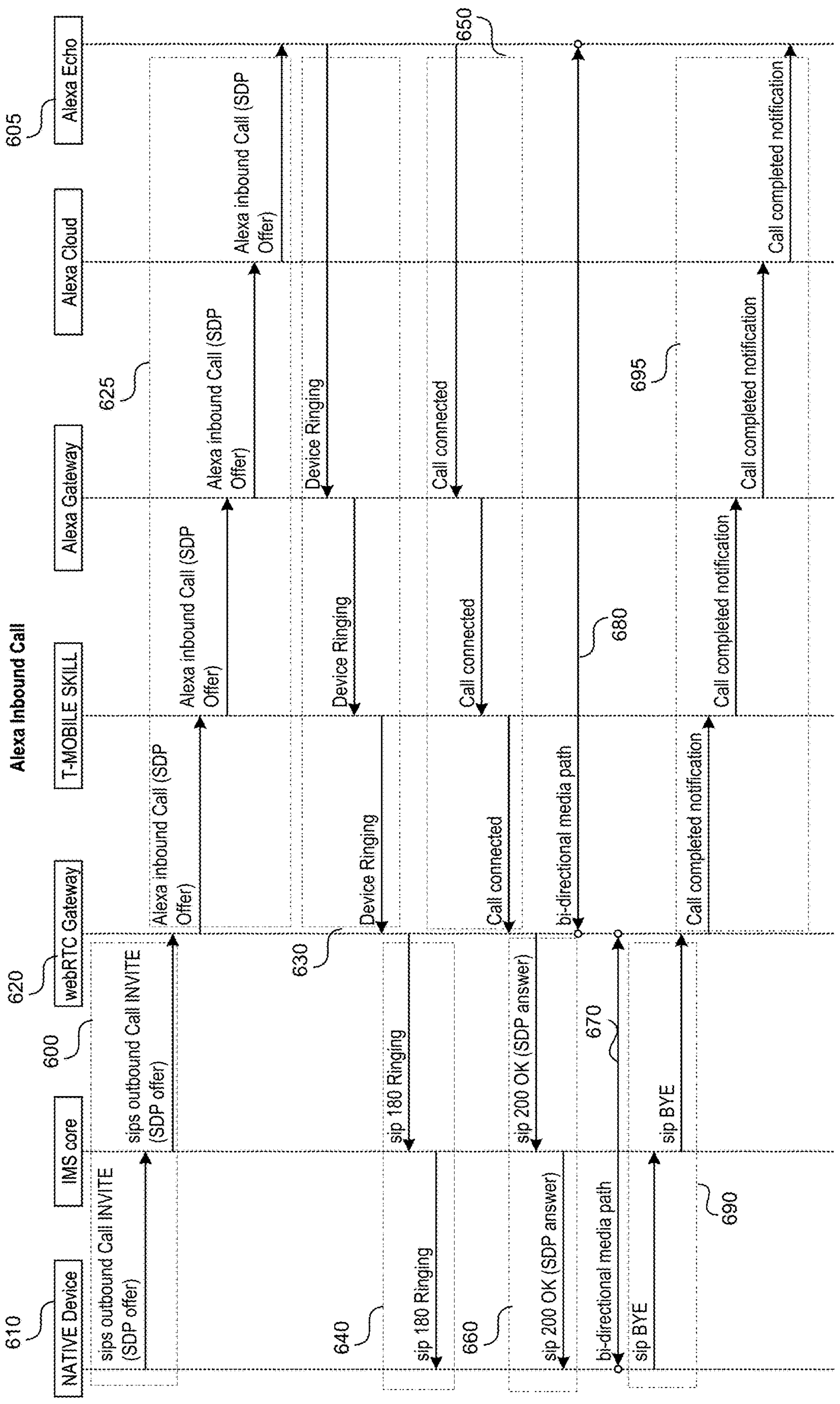
FIG. 6 shows a flow of commands to establish a call initiated by another UE on the network to the home device.

FIG. 6 shows a flow of commands to establish a call initiated by another UE on the network 100 in FIG. 1 to the home device. Messages 600 are SIP messages, indicating that the UE 610 wants to establish a connection with a number associated with the home device 605 and another UE operating on the network 100. The webRTC gateway 620 translates the incoming SIP messages 600 into HTTP messages 625 indicating the request for the connection and sends them to the home device 605. The home device 605 sends HTTP messages 630, indicating that the home device is ringing, to the webRTC gateway 620. The webRTC gateway 620 translates the HTTP messages 630 into SIP messages 640 indicating that the home device 605 is ringing, and sends them to the UE 610.

HTTP messages 650 indicate that the call is connected. The webRTC gateway 620 translates the HTTP messages 650 into SIP messages 660 indicating that the call is connected, and sends them to the UE 610. The webRTC gateway 620 translates the substantive SIP messages 670 and substantive HTTP messages 680 into each other, thus facilitating the communication between the UE 610 and the home device 605. SIP messages 690 indicate the end of the call, and when translated by the webRTC gateway 620, produce HTTP messages 695 indicating to the home device 605 that the call is over.

Figure 7:
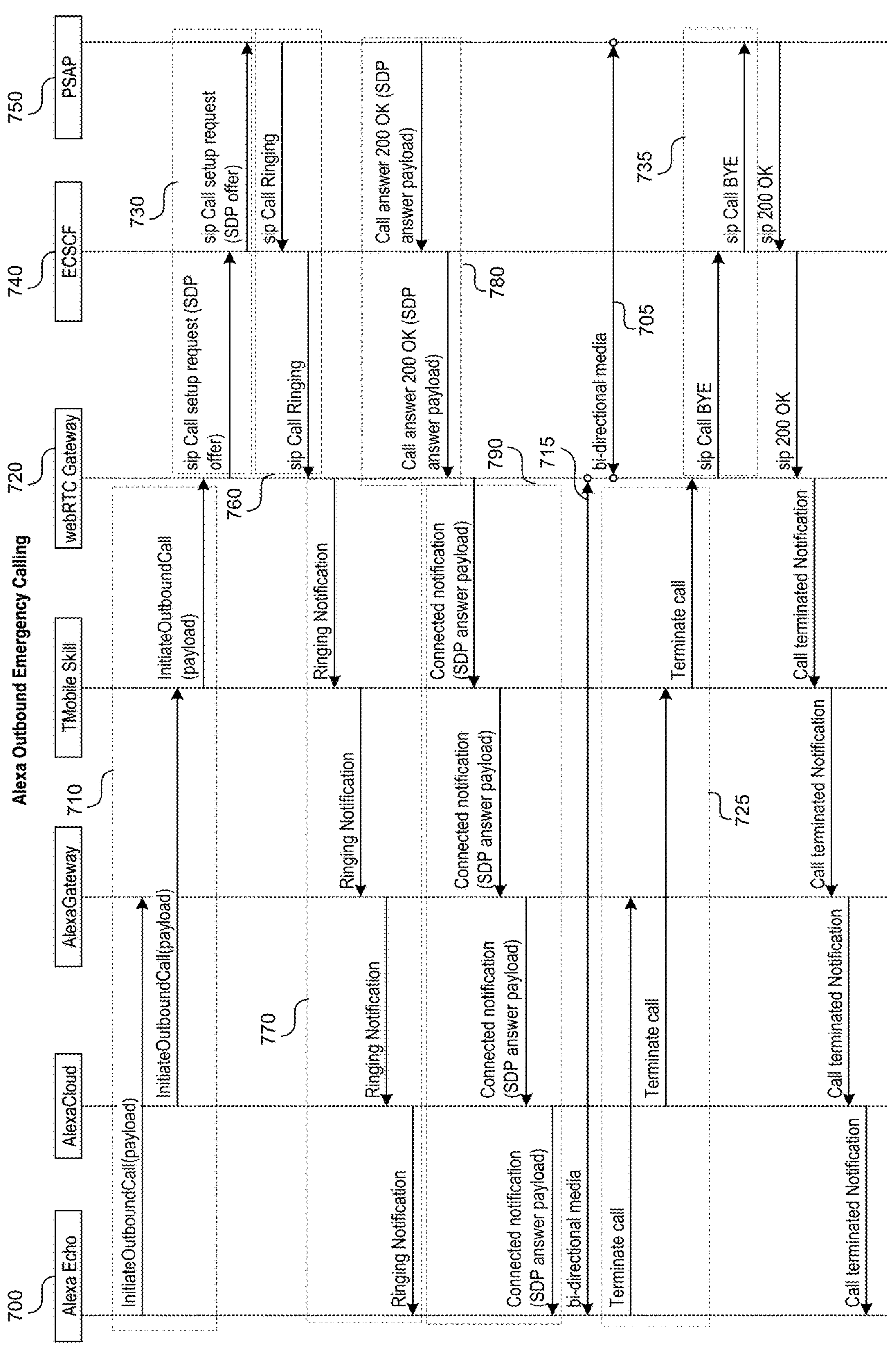
FIG. 7 shows a flow of commands to establish an emergency call initiated by the home device.

FIG. 7 shows a flow of commands to establish an emergency call initiated by the home device. The home device 700 sends HTTP messages 710 to the webRTC gateway 720 indicating an initiation of an emergency call. As explained in this application, the webRTC gateway 720 translates the HTTP messages 710 into SIP messages 730 indicating a request for an emergency connection. The webRTC gateway 720 sends the SIP messages 730 to the Emergency Call Session Control Function (E-CSCF) 740 and the public safety answering point (PSAP) 750. The webRTC gateway 720 translates SIP messages 760 indicating ringing into HTTP messages 770, and sends them to the home device 700. The webRTC gateway 720 translates SIP messages 780 indicating that the call is answered into HTTP messages 790, and sends them to the home device 700.

The webRTC gateway 720 translates the substantive SIP messages 705 and substantive HTTP messages 715 into each other, thus facilitating the communication between the home device 700 and the PSAP 750. The webRTC gateway 720 translates HTTP messages 725 terminating the call into SIP messages 735, to terminate the call.

Figure 8:
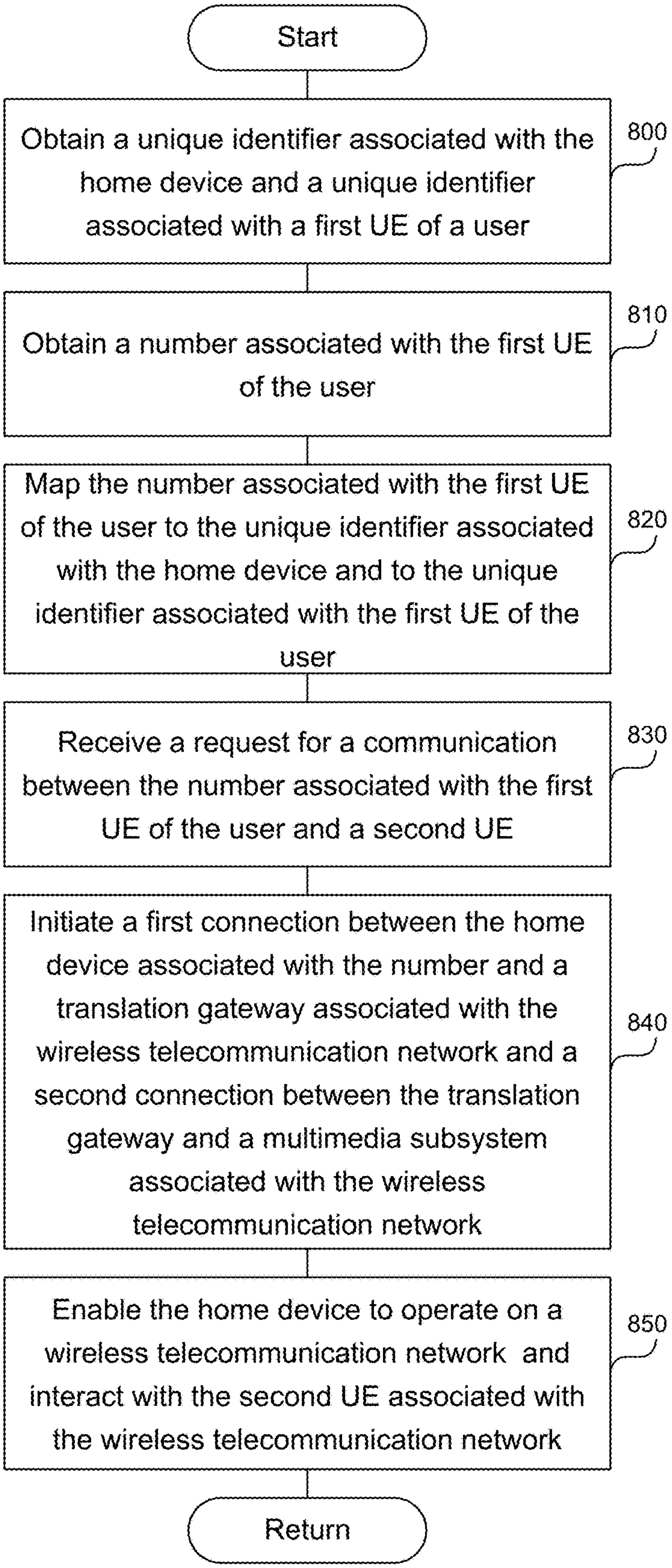
FIG. 8 is a flowchart of a method to enable a home device to operate on a network and interact with a second mobile device associated with the network.

FIG. 8 is a flowchart of a method to enable a home device to operate on a network and interact with a second mobile device associated with the network. A hardware or software processor executing instructions described in this application can, in step 800, obtain a unique identifier associated with the home device and a unique identifier associated with a first UE of a user.

In step 810, the processor can obtain an identifier, e.g., a number or a phone number, associated with the first UE of the user. The number, e.g., a phone number, enables the network to establish a call between the first UE of the user and another UE operating on the network.

In step 820, the processor can map the number associated with the first UE of the user to the unique identifier associated with the home device and to the unique identifier associated with the first UE of the user.

In step 830, the processor can receive a request for a communication between the number associated with the first UE of the user and a second UE.

In step 840, the processor can initiate a first connection between the home device associated with the number and a translation gateway associated with the network and a second connection between the translation gateway and a multimedia subsystem associated with the network. The translation gateway can be webRTC gateway, while the multimedia subsystem can be IMS core.

In step 850, the processor can enable the home device to operate on a network and interact with the second UE associated with the network by performing the following steps. First, the processor can receive a first protocol message through the first connection or a second protocol message through the second connection, where the first protocol and the second protocol are different protocols. The first protocol can be HTTP protocol, while the second protocol can be SIP protocol. The processor can translate the first protocol message into a particular second protocol message prior to sending the particular second protocol message to the multimedia subsystem, or can translate the second protocol message into a particular first protocol message prior to sending the particular first protocol message to the home device.

The home device can correspond to multiple numbers associated with multiple UEs. The processor can obtain multiple unique identifiers associated with multiple UEs and obtain multiple numbers associated with the multiple UEs. A first number, e.g., a phone number, among the multiple numbers enables the network to establish a call between a first UE associated with the first number and another UE operating on the network. The processor can map the multiple numbers to the unique identifier associated with the home device. The processor can receive an indication of an incoming communication associated with the first number among the multiple numbers. The processor can cause the home device and the first UE to produce a notification of the incoming communication.

Alternatively, to place a call coming from the home device, the processor can receive an indication of an outgoing communication associated with the home device, where the outgoing communication indicates a receiver including the second UE. The processor can request a particular number among the multiple numbers associated with the home device and associated with the outgoing communication. The processor can receive an indication of the particular number from the home device. The processor can establish a connection between the particular number, the home device, and the receiver including the second UE.

The home device can place emergency calls using the network 100 in FIG. 1. The processor can store a physical address and the unique identifier associated with the home device. The processor can receive a 911 emergency call from the home device to a 911 operator. The processor can share the physical address with the 911 operator. If the home device has multiple numbers mapped to it, the processor can also map multiple physical addresses to the multiple numbers, for example, one physical address associated with one phone number. When the processor receives the 911 call, the processor can request a particular physical address among the multiple addresses, or can request a particular number among the multiple numbers. Once the processor receives the particular number, the processor can retrieve the appropriate physical address, and send the appropriate physical address to the 911 operator.

The processor can also transcode between various audio codecs. The processor can receive the first protocol message through the first connection, where the first protocol message is encoded using a first codec by the home device. The home device can be configured to encode and decode an audio into the first codec. The processor can transcode the first protocol message encoded using the first codec into a second protocol message using a second codec. The multimedia subsystem can be configured to decode and encode the second codec. The processor can send the second protocol message using the second codec to the multimedia subsystem. Additionally, the processor can receive another second protocol message through the second connection, where the second protocol message is encoded using the second codec. The processor can convert the second protocol message encoded using the second codec into a first protocol message using the first codec. The processor can send the first protocol message using the first codec to the home device.

The processor can receive, from the second UE, an indication of a request for communication with the first UE. The processor can cause the first UE and the home device to generate a notification of the request for communication to the user, e.g., ringing of both the first UE and the home device. The processor can determine that the user accepted the request for communication at one of the first UE or the home device. Upon determining that the user accepted the request for communication at one of the first UE or the home device, the processor can cause the first UE and the home device to stop generating the notification of the request for communication.

The processor can receive a voice instruction to initiate the communication between the home device and the second UE. The processor can generate an indication of the communication requested by the number associated with the first UE. The processor can send the indication of the communication including the number associated with the first UE to the second UE. The processor can receive, from the second UE, an indication of the acceptance of the communication. The processor can establish a connection between the home device and the second UE, where the second UE is configured to indicate that the connection is associated with a number associated with the first UE.

Figure 9:
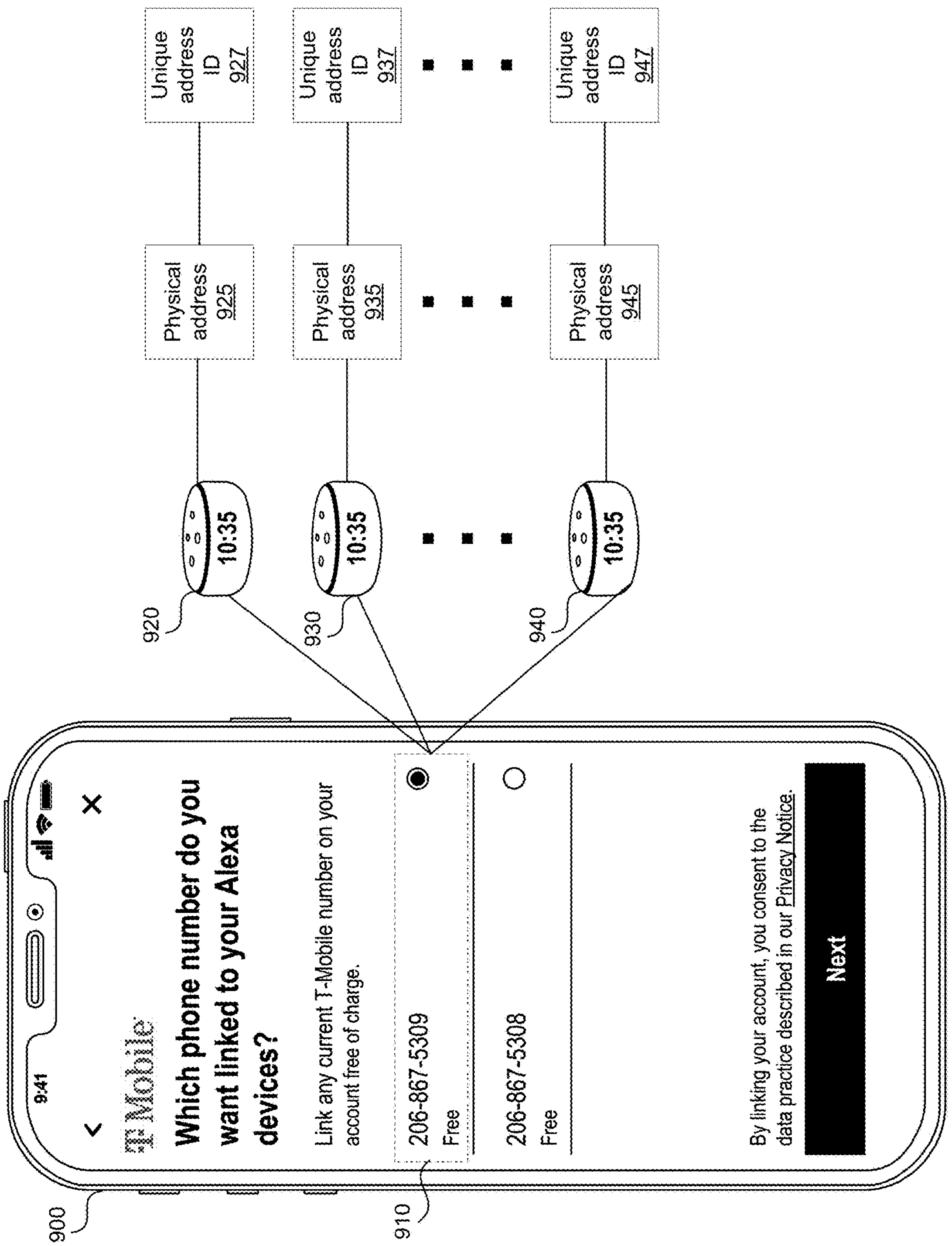
FIG. 9 shows linking of a phone number to various home devices, physical addresses, and unique address identifiers (IDs).

Enabling a Home Device Operating on a Wireless Telecommunication Network to Report a Physical Address Associated with the Home Device in an Emergency Call FIG. 9 shows linking of a phone number to various home devices, physical addresses, and unique address identifiers (IDs). Each UE 900 operating on the network 100 in FIG. 1 has an identifier 910, e.g., a number or a phone number, that the UE 900 can use to communicate with other UEs operating on the network. The identifier 910 can be associated with, e.g., linked with, multiple devices operating on the network 100, such as home devices 920, 930, 940. The home device 920, 930, 940 can be Amazon Alexa, Google Home, or another device or software to set up, manage, automate, and control multiple compatible devices in a home.

For example, a call placed on the phone number associated with the UE 900 will make all of the UE 900 and the home devices 920, 930, 940 ring, as long as all of the devices are associated with the same identifier 910.

Each home device 920, 930, 940 can be associated with a physical address 925, 935, 945 specifying the location of the corresponding home device. Each home device 920, 930, 940 corresponds to a single physical address 925, 935, 945; however, there can be more physical addresses than home devices, and some physical addresses can be unassigned. In addition, multiple home devices 920, 930, 940 can be assigned to a single physical address 925, 935, 945.

Each physical address 925, 935, 945 can have a corresponding unique address ID 927, 937, 947, where the mapping between the physical addresses and the corresponding unique address IDs is one-to-one. The network 100 can store the physical addresses and the corresponding unique address IDs 927, 937, 947, and can use the unique address ID in communication with the home device 920, 930, 940.

For example, when the home device 920, 930, 940 places an emergency call, the network 100, acting as an intermediary between the home device and the emergency operator, can obtain the physical address 925, 935, 945 of the home device 920, 930, 940, and can pass the physical address to the emergency operator who needs the address to dispatch assistance.

Figure 10:
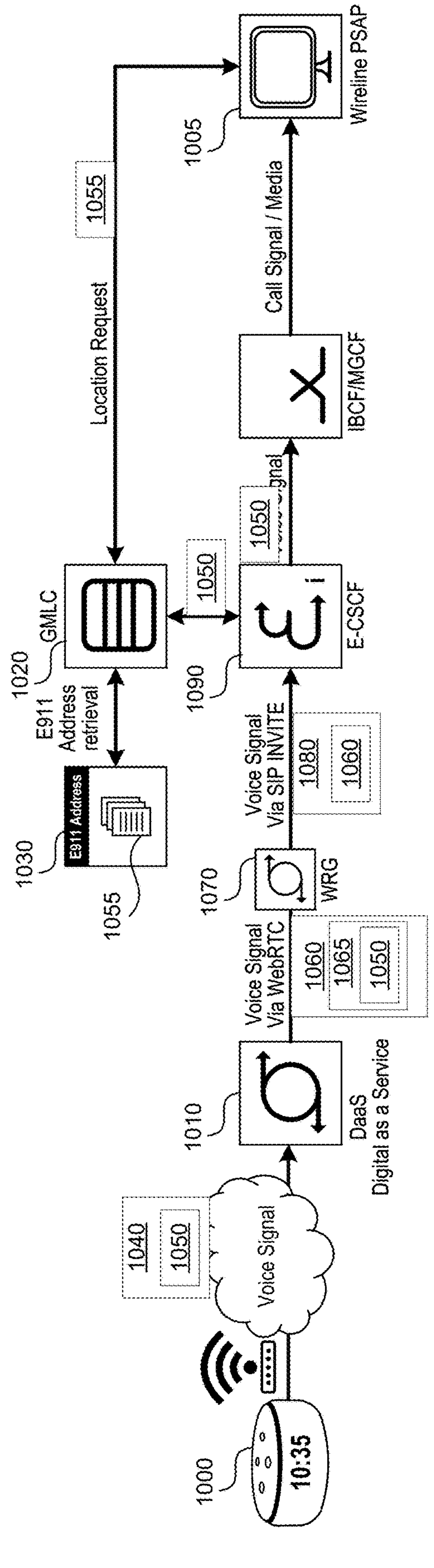
FIG. 10 shows steps to communicate the physical address of a home device to an emergency operator via the network.

FIG. 10 shows steps to communicate the physical address of a home device to an emergency operator via the network 100 in FIG. 1. During the account linking, described above, the network 100 can associate, e.g., link, the home device 1000 to a physical address 925, 935, 945 in FIG. 9.

The module 1010, e.g., digits as a service (DaaS), can generate and assign a unique address ID 927, 937, 947 in FIG. 9 to each physical address 925, 935, 945. The unique address ID 927, 937, 947 obfuscates the physical address 925, 935, 945, and consequently, the physical address cannot be derived from the unique address identifier.

Both the network 100 and the home device 1000 can map the unique address ID 927, 937, 947 to the corresponding physical address 925, 935, 945. On the network 100 side, during linking, the module 1010 can forward the unique address ID 927, 937, 947 and the physical address 925, 935, 945 to the Gateway Mobile Location Center (GMLC) 1020. The GMLC 1020 stores the mapping between the unique address ID 927, 937, 947 and the corresponding physical address 925, 935, 945 in the database 1030. The GMLC 1020 contains functionality required to support location-based service.

During an emergency call, e.g., a 911 call, the home device 1000 placing the emergency call can pass the unique address ID 1050 associated with the home device 1000 to the module 1010 in payload of a message 1040. In turn, the module 1010 can include the unique address ID 1050 in the header 1065 of a message 1060 sent to the webRTC gateway 1070. The webRTC gateway 1070 can include the header 1065 in the message 1080 setting up the emergency call session toward the GMLC 1020 via the E-CSCF 1090.

The GMLC 1020 can receive the unique address ID 1050, and retrieve the associated physical address 1055. When the PSAP 1005 requests the physical location of the home device 1000, the GMLC 1020 provides the physical address 1055 to the PSAP.

Figure 11:
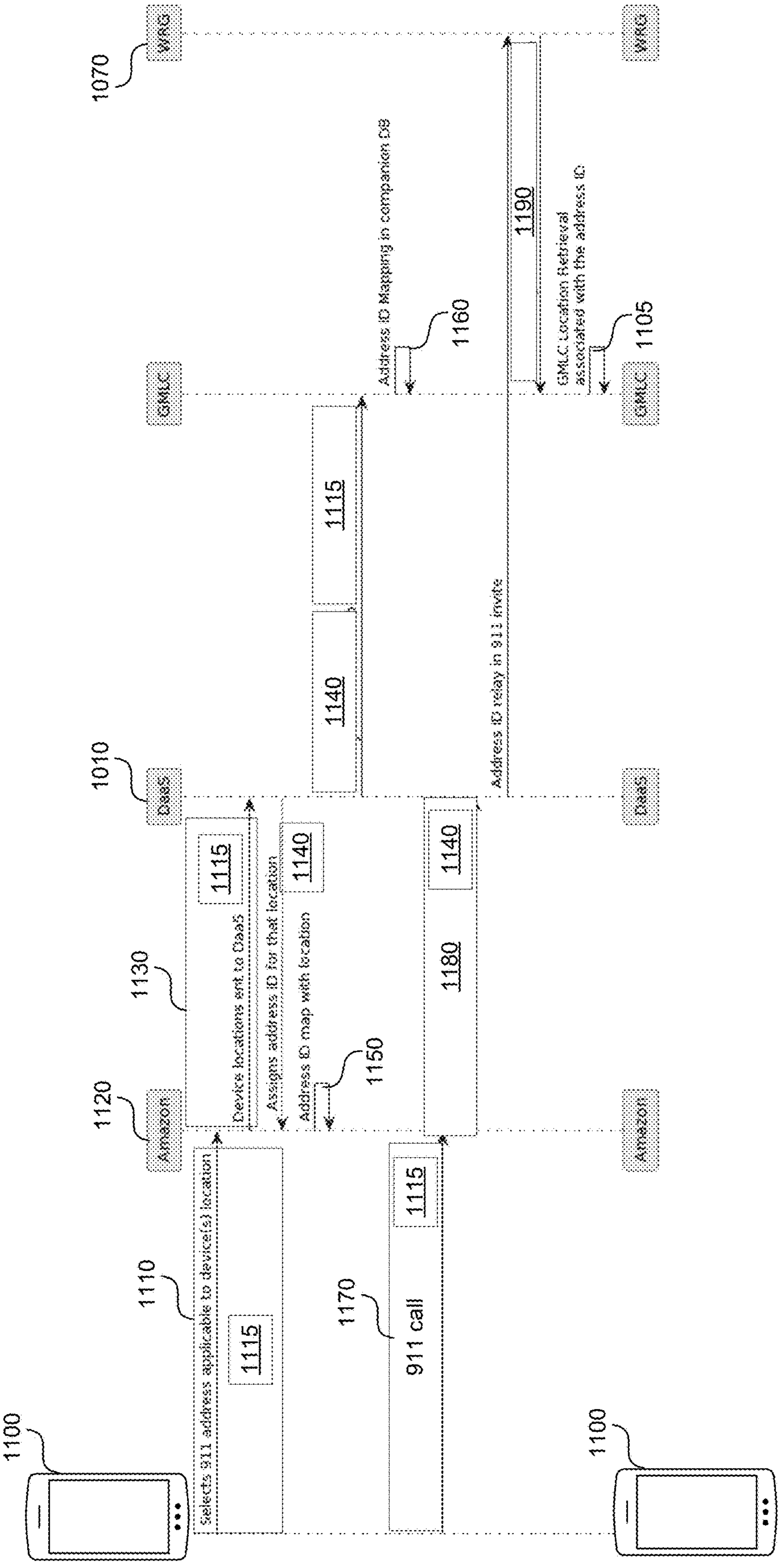
FIG. 11 shows steps to create a new unique address identifier for a home device.

FIG. 11 shows steps to create a new unique address identifier for a home device. The UE 1100 can be the home device, or a different device. The UE 1100 can send the message 1110 including a 911 physical address 1115 associated with the UE location to the server 1120. The server 1120 can send the message 1130 including the physical address 1115 to the module 1010.

The module 1010 can generate a unique address ID 1140 and send it to the server 1120. In step 1150, the server 1120 can map the unique address ID 1140 to the physical address 1115. Further, the module 1010 can forward the unique address ID 1140 and the physical address 1115 to the GMLC 1020. The GMLC 1020, in step 1160, can map the physical address 1115 to the unique address ID 1140, and store the mapping in the database 1030 in FIG. 10.

The UE 1100 can initiate a 911 call 1170, and pass the physical address 1115 to the server 1120. The server 1120 can retrieve the unique address ID 1140 corresponding to the physical address 1115, and can send the unique address ID 1140 in the message 1180 to the module 1010. The module 1010 can send the unique address ID 1140 the webRTC gateway 1070, which in turn can send the request 1190 to retrieve the physical address 1115. In step 1105, the GMLC 1020 can retrieve the physical address 1115 associated with the UE 1100.

Figure 12:
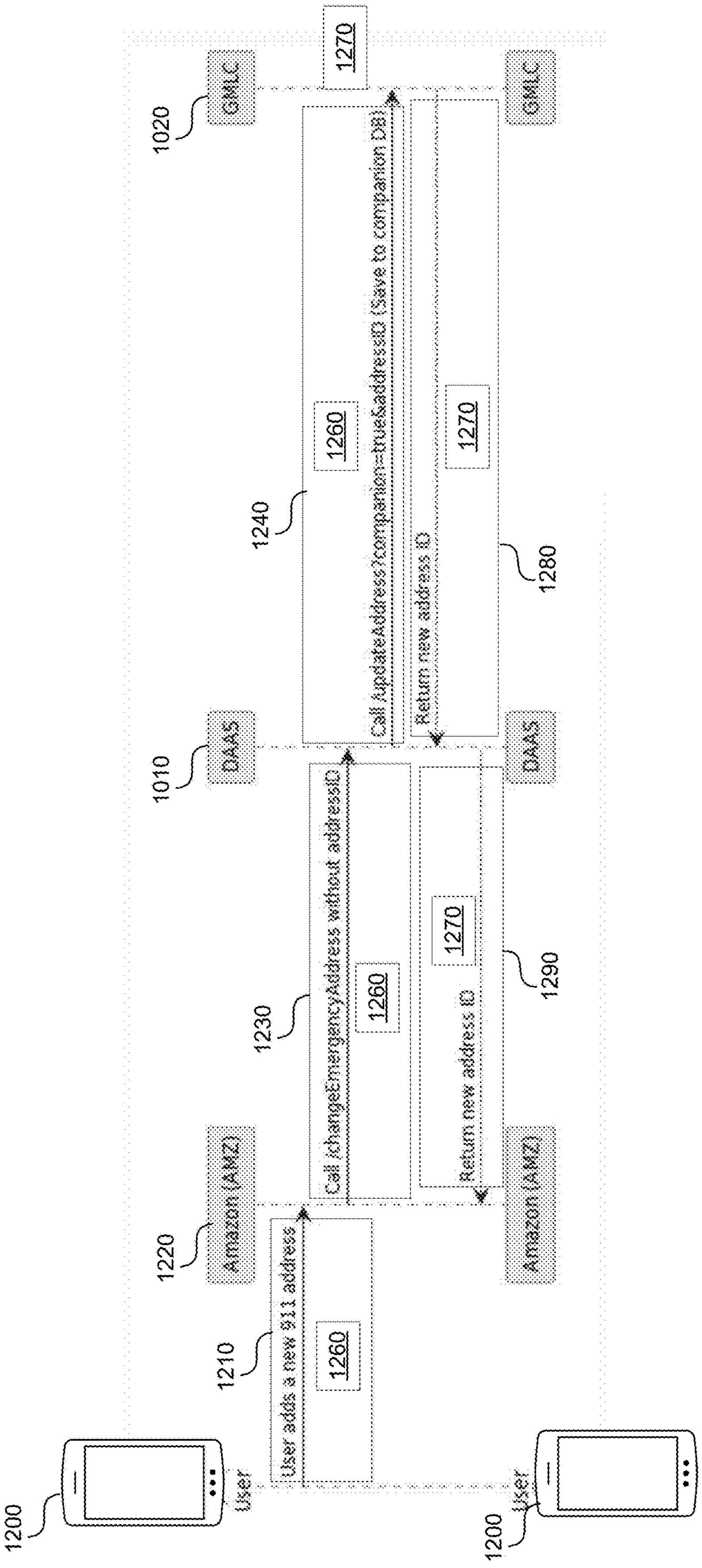
FIG. 12 shows steps to add a new physical address to a home device.

FIG. 12 shows steps to add a new physical address to a home device. The UE 1200 can send a message 1210 requesting to add a new address 1260 to a server 1220 associated with the home device. The UE 1200 can be the home device, or a different device. The server 1220 can send the message 1230 to the module 1010 to add the new address 1260 as an emergency address. The message 1230 does not have the unique address identifier because the unique address identifier has not been generated yet.

The module 1010 can send the message 1240 including the new address 1260 to the GMLC 1020. The GMLC 1020 can generate the unique address ID 1270 corresponding to the new address 1260. The module 1010 can send the unique address ID 1270 in the message 1280 to the module 1010, which in turn can send the message 1290 including the unique address ID 1270 to UE 1200. In addition, the module 1010 can send the unique address ID 1270 and the new address 1260 to the database 1030 in FIG. 10.

Figure 13:
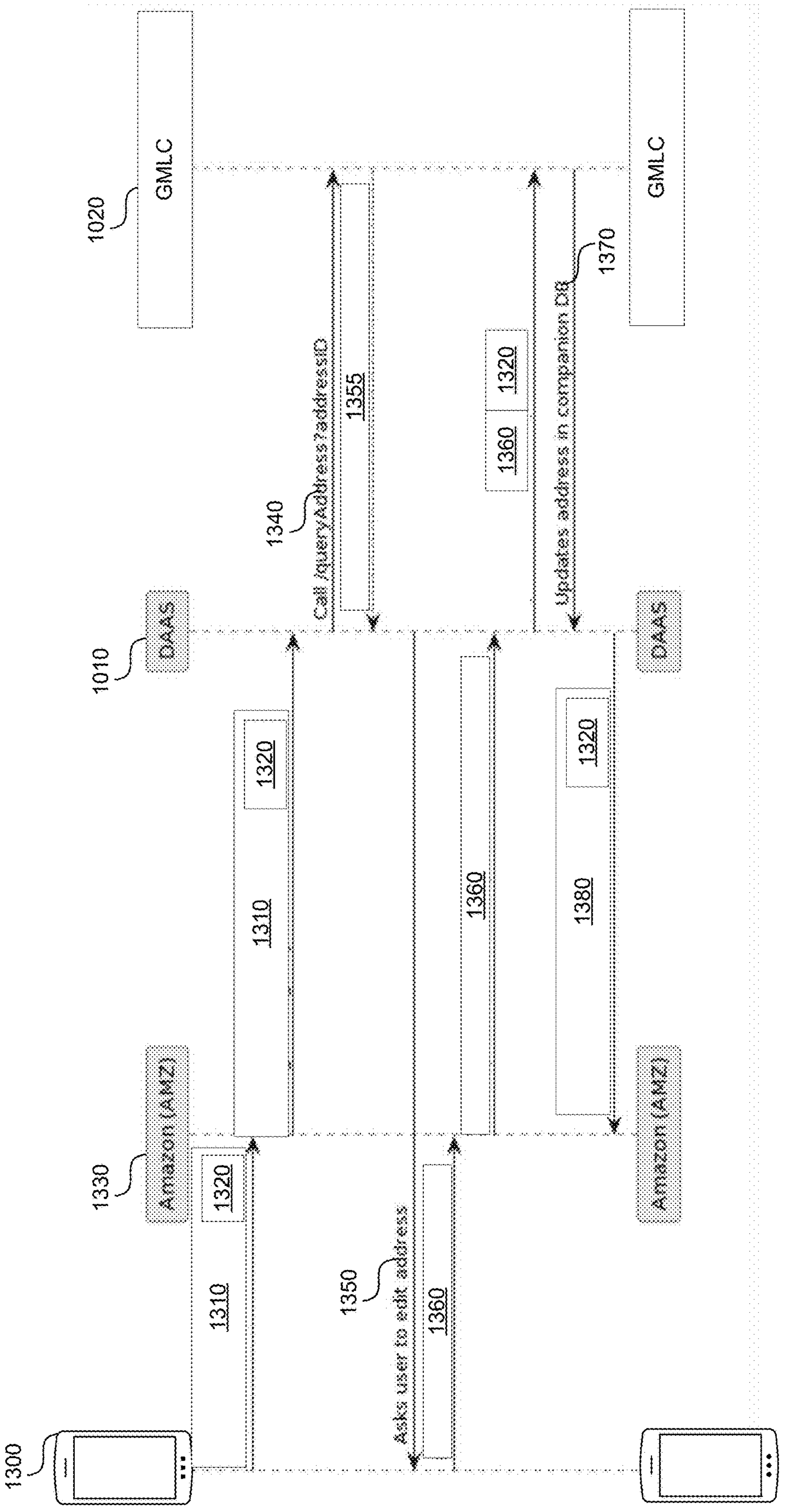
FIG. 13 shows steps to change the physical address associated with a home device.

FIG. 13 shows steps to change the physical address associated with a home device. The UE 1300 can send the message 1310 including a unique address ID 1320 to a server 1330 associated with the home device. The message 1310 can include a request to change the physical address associated with the unique address ID 1320.

The module 1010 can send a message 1340 to the GMLC 1020 requesting the physical address associated with the unique address ID 1320. The GMLC 1020 can return the physical address 1355. The module 1010 can send a message 1350 to the UE 1300 requesting a new address. The UE 1300 can provide the new address 1360 to the module 1010. The module 1010 can send the new address 1360 and the unique address ID 1320 to the GMLC 1020, to update the database 1030 in FIG. 10.

Once the database 1030 is updated, the GMLC 1020 can send a message 1370 to confirm that the update is complete. The module 1010 can send a message 1380 to the server 1330 including the unique address ID 1320 indicating that the update is complete.

Figure 14:
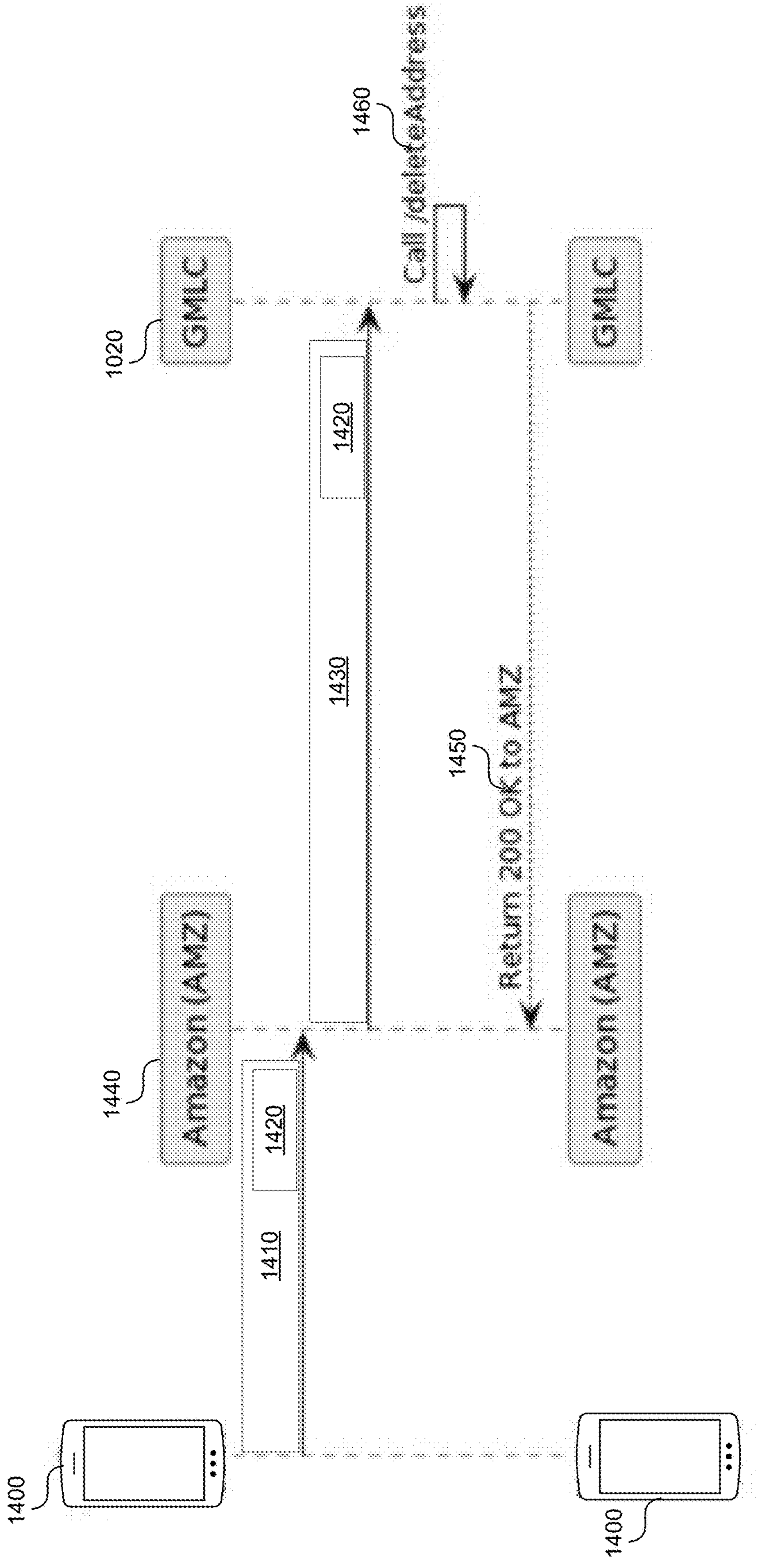
FIG. 14 shows steps to delete a physical address from a home device.

FIG. 14 shows steps to delete a physical address from a home device. The UE 1400 can send a message 1410, including a unique address ID 1420, to a server 1440 associated with the home device, and the server 1440 can send the message 1430, including the unique address ID 1420, to GMLC 1020. The messages 1410, 1430 can include a request to delete the physical address associated with the unique address ID 13 20.

In step 1460, the GMLC 1020 can delete the unique address ID 1420 and the corresponding physical address from the database 1030 in FIG. 10. Upon completing step 1460, the GMLC 1020 can send a confirmation message 1450 to the server 1440. The server 1440, in turn, can also delete the unique address identifier and the corresponding physical address.

Figure 15:
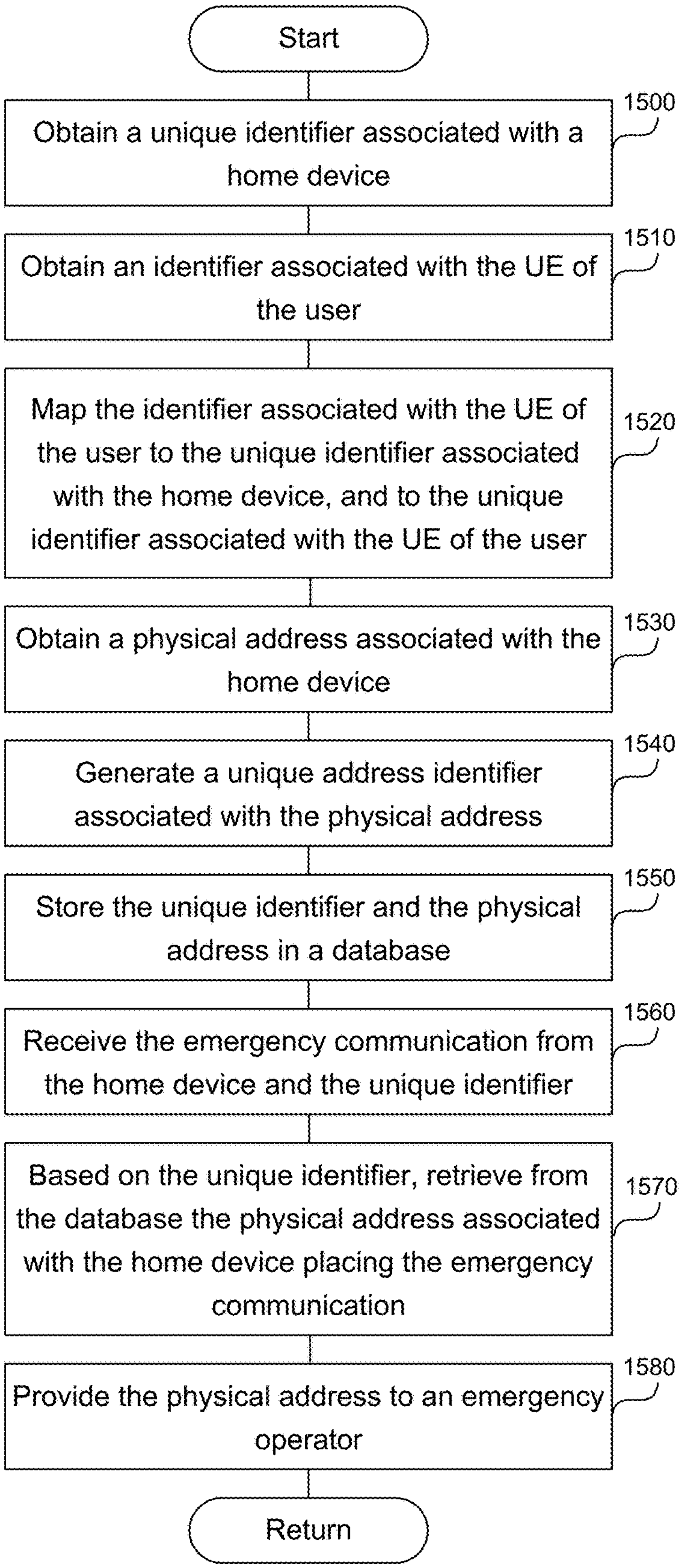
FIG. 15 is a flowchart of a method to enable a home device operating on a wireless telecommunication network to report a physical address associated with the home device in an emergency call.

FIG. 15 is a flowchart of a method to enable a home device operating on a wireless telecommunication network to report a physical address associated with the home device in an emergency call. A hardware or software processor executing instructions described in this application can, in step 1500, obtain a unique identifier associated with the home device.

In step 1510, the processor can obtain an identifier associated with the UE of the user, where the identifier enables the wireless telecommunication network to establish a call between the UE of the user and another UE operating on the wireless telecommunication network.

In step 1520, the processor can map the identifier associated with the UE of the user to the unique identifier associated with the home device, and to the unique identifier associated with the UE of the user.

In step 1530, the processor can obtain a physical address associated with the home device. In step 1540, the processor can generate a unique address identifier associated with the physical address, where the unique address identifier obfuscates the physical address. In other words, the physical address cannot be derived from the unique address identifier.

In step 1550, the processor can store the unique address identifier and the physical address in a database associated with the wireless telecommunication network. Each physical address is associated with the unique address identifier, where one ID corresponds to one physical address.

In step 1560, the processor can receive the emergency communication from the home device and the unique address identifier. In step 1570, based on the unique address identifier, the processor can retrieve from the database the physical address associated with the home device placing the emergency communication. In step 1580, the processor can provide the physical address to an emergency operator.

To receive the unique address identifier, the processor can obtain the unique address identifier from a payload associated with a message initiating the emergency communication. During an emergency call, e.g., a 911 call, the processor can use the unique address identifier to identify the home device's location. The home device can pass the appropriate unique address identifier to DaaS in payload. The processor can incorporate the unique address identifier among the multiple unique address identifiers into a header of a second message. The processor can send the second message to a webRTC gateway. The processor can send a third message including the unique address identifier among the multiple unique address identifiers from the webRTC gateway to an E-CSCF. The processor can send a fourth message from the E-CSCF to a GMLC. The processor can retrieve, by the GMLC, from the database the physical address based on the unique address identifier among the multiple unique address identifiers. Finally the processor can send the physical address to a PSAP.

The processor can add a new physical address to an existing account. Specifically, the processor can receive a request to add a third physical address associated with the home device, where the third physical address is different from the physical address. The processor can generate a third unique address identifier associated with the third physical address. The processor can store the third physical address and the third unique address identifier in the database. The processor can send the third unique address identifier to the home device.

The processor can change an existing physical address. Specifically, the processor can receive a request to change the physical address, where the request includes the unique address identifier. The processor can obtain the physical address from the database. The processor can obtain a third physical address associated with the home device. The processor can change the physical address to the third physical address in the database. The processor can send the unique address identifier to the home device.

The processor can delete a physical address. Specifically, the processor can receive a request to delete the physical address associated with the home device. The processor can send a request to the database to delete the physical address from the database. The processor can receive, from the database, an indication that the physical address is deleted. The processor can send a confirmation to the home device that the physical address is deleted.

Computer System

Figure 16:
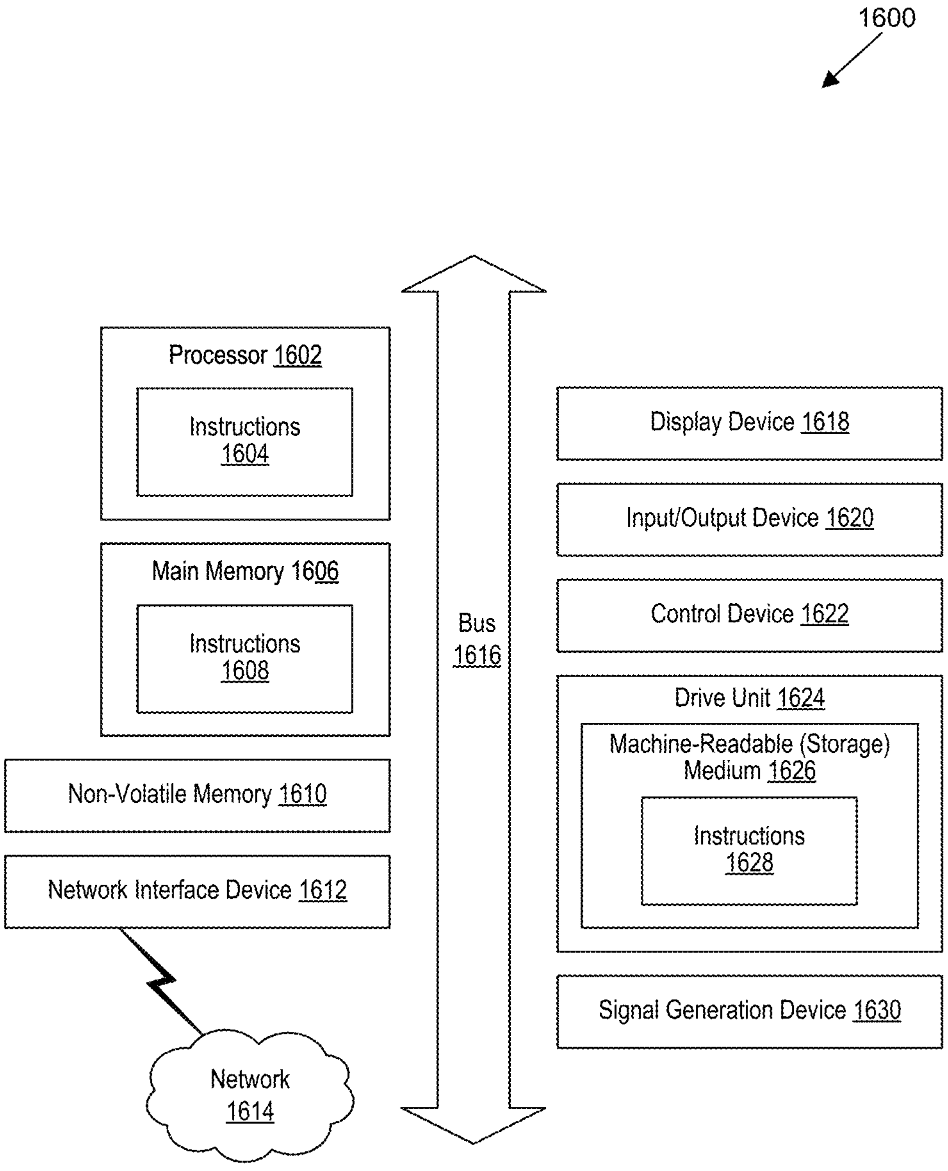
FIG. 16 is a block diagram that illustrates an example of a computer system 1600 in which at least some operations described herein can be implemented.

FIG. 16 is a block diagram that illustrates an example of a computer system 1600 in which at least some operations described herein can be implemented. As shown, the computer system 1600 can include: one or more processors 1602, main memory 1606, non-volatile memory 1610, a network interface device 1612, a video display device 1618, an input/output device 1620, a control device 1622 (e.g., keyboard and pointing device), a drive unit 1624 that includes a machine-readable (storage) medium 1626, and a signal generation device 1630 that are communicatively connected to a bus 1616. The bus 1616 represents one or more physical buses and/or point-to-point connections that are connected by appropriate bridges, adapters, or controllers. Various common components (e.g., cache memory) are omitted from FIG. 16 for brevity. Instead, the computer system 1600 is intended to illustrate a hardware device on which components illustrated or described relative to the examples of the Figures and any other components described in this specification can be implemented.

The computer system 1600 can take any suitable physical form. For example, the computing system 1600 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 1600. In some implementations, the computer system 1600 can be an embedded computer system, a system-on-chip (SOC), a single-board computer system (SBC), or a distributed system such as a mesh of computer systems, or it can include one or more cloud components in one or more networks. Where appropriate, one or more computer systems 1600 can perform operations in real time, in near real time, or in batch mode.

The network interface device 1612 enables the computing system 1600 to mediate data in a network 1614 with an entity that is external to the computing system 1600 through any communication protocol supported by the computing system 1600 and the external entity. Examples of the network interface device 1612 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 1606, non-volatile memory 1610, machine-readable medium 1626) can be local, remote, or distributed. Although shown as a single medium, the machine-readable medium 1626 can include multiple media (e.g., a centralized/distributed database and/or associated caches and servers) that store one or more sets of instructions 1628. The machine-readable medium 1626 can include any medium that is capable of storing, encoding, or carrying a set of instructions for execution by the computing system 1600. The machine-readable medium 1626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 1610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1604, 1608, 1628) set at various times in various memory and storage devices in computing device(s). When read and executed by the processor 1602, the instruction(s) cause the computing system 1600 to perform operations to execute elements involving the various aspects of the disclosure.

REMARKS

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A non-transitory, computer-readable storage medium comprising instructions recorded thereon, the instructions to enable a home device to operate on a wireless telecommunication network and interact with a second mobile device associated with the wireless telecommunication network, wherein the instructions, when executed by at least one data processor of a system, cause the system to:

obtain a unique identifier associated with the home device and a unique identifier associated with a first mobile device of a user;

obtain a number associated with the first mobile device of the user, wherein the number enables the wireless telecommunication network to establish a call between the first mobile device of the user and another mobile device operating on the wireless telecommunication network;

map the number associated with the first mobile device of the user to the unique identifier associated with the home device and to the unique identifier associated with the first mobile device of the user;

receive a request for a communication between the number associated with the first mobile device of the user and a second mobile device;

initiate a first connection between the home device associated with the number and a Web Real-Time Communication (webRTC) gateway associated with the wireless telecommunication network and a second connection between the webRTC gateway and an Internet Protocol Multimedia subsystem (IMS) core associated with the wireless telecommunication network; and enable the home device to operate on the wireless telecommunication network and interact with the second mobile device associated with the wireless telecommunication network by:

receiving a HyperText Transfer Protocol (HTTP) message through the first connection or a Session Initiation Protocol (SIP) message through the second connection; and translating the HTTP message into a particular SIP message prior to sending the particular SIP message to the IMS core, or translating the SIP message into a particular HTTP message prior to sending the particular HTTP message to the home device.

2. The non-transitory, computer-readable storage medium of claim 1, comprising instructions to:

obtain multiple unique identifiers associated with multiple first mobile devices;

obtain multiple numbers associated with the multiple first mobile devices, wherein a first number among the multiple numbers enables the wireless telecommunication network to establish a call between a first mobile device associated with the first number and the another mobile device operating on the wireless telecommunication network;

map the multiple numbers to the unique identifier associated with the home device;

receive an indication of an incoming communication associated with the first number among the multiple numbers; and cause the home device and the first mobile device to produce a notification of the incoming communication.

3. The non-transitory, computer-readable storage medium of claim 1, comprising instructions to:

obtain multiple unique identifiers associated with multiple first mobile devices;

obtain multiple numbers associated with the multiple first mobile devices, wherein a first number among the multiple numbers enables the wireless telecommunication network to establish a call between a first mobile device associated with the first number and the another mobile device operating on the wireless telecommunication network;

map the multiple numbers to the unique identifier associated with the home device;

receive an indication of an outgoing communication associated with the home device, wherein the outgoing communication indicates a receiver including the second mobile device;

request a particular number among the multiple numbers associated with the home device and associated with the outgoing communication;

receive an indication of the particular number from the home device; and establish a connection between the particular number, the home device, and the receiver including the second mobile device.

4. The non-transitory, computer-readable storage medium of claim 1, comprising instructions to:

store a physical address and the unique identifier associated with the home device;

receive an enhanced 911 call from the home device to an enhanced 911 operator; and share the physical address with the enhanced 911 operator.

5. The non-transitory, computer-readable storage medium of claim 1, comprising instructions to:

receive the HTTP message through the first connection, wherein the HTTP message is encoded using a first codec, wherein the home device is configured to encode an audio into the first codec;

convert the HTTP message encoded using the first codec into a SIP message using a second codec, wherein the IMS core is configured to decode the second codec;

send the SIP message using the second codec to the IMS core;

receive another SIP message through the second connection, wherein the other SIP message is encoded using the second codec;

convert the other SIP message encoded using the second codec into another HTTP message using the first codec; and send the other HTTP message using the first codec to the home device.

6. The non-transitory, computer-readable storage medium of claim 1, comprising instructions to:

receive, from the second mobile device, an indication of a request for communication with the first mobile device;

cause the first mobile device and the home device to generate a notification of the request for communication to the user;

determine that the user accepted the request for communication at one of the first mobile device or the home device; and upon determining that the user accepted the request for communication at one of the first mobile device or the home device, cause the first mobile device and the home device to stop generating the notification of the request for communication.

7. The non-transitory, computer-readable storage medium of claim 1, comprising instructions to:

receive a voice instruction to initiate the communication between the number associated with the first mobile device of the user and the second mobile device, wherein the communication is between the home device and the second mobile device;

generate an indication of the communication requested by the number associated with the first mobile device;

send the indication of the communication including the number associated with the first mobile device to the second mobile device;

receive, from the second mobile device, an indication of an acceptance of the communication; and establish a connection between the home device and the second mobile device, wherein the second mobile device is configured to indicate that the connection is associated with the number associated with the first mobile device.

8. A method comprising:

obtaining a unique identifier associated with a home device and a unique identifier associated with a first UE of a user;

obtaining an identifier associated with the first UE of the user, wherein the identifier enables a wireless telecommunication network to establish a call between the first UE of the user and another UE operating on the wireless telecommunication network;

mapping the identifier associated with the first UE of the user to the unique identifier associated with the home device and to the unique identifier associated with the first UE of the user;

receiving a request for a communication between the identifier associated with the first UE of the user and a second UE;

initiating a first connection between the home device associated with the identifier and a translation gateway associated with the wireless telecommunication network and a second connection between the translation gateway and a multimedia subsystem associated with the wireless telecommunication network; and enabling the home device to operate on the wireless telecommunication network and interact with the second UE associated with the wireless telecommunication network by:

receiving a first protocol message associated with a first protocol through the first connection or a second protocol message associated with a second protocol through the second connection, wherein the first protocol and the second protocol are different protocols; and translating the first protocol message into a particular second protocol message prior to sending the second protocol message to the multimedia subsystem, or translating the second protocol message into a particular first protocol message prior to sending the particular first protocol message to the home device.

9. The method of claim 8, comprising:

obtaining multiple unique identifiers associated with multiple UEs;

obtaining multiple identifiers associated with the multiple UEs, wherein a first identifier among the multiple identifiers enables the wireless telecommunication network to establish a call between a first UE associated with the first identifier and the another UE operating on the wireless telecommunication network;

mapping the multiple identifiers to the unique identifier associated with the home device;

receiving an indication of an incoming communication associated with the first identifier among the multiple identifiers; and causing the home device and the first UE to produce a notification of the incoming communication.

10. The method of claim 8, comprising:

obtaining multiple unique identifiers associated with multiple UEs;

obtaining multiple identifiers associated with the multiple UEs, wherein a first identifier among the multiple identifiers enables the wireless telecommunication network to establish a call between a first UE associated with the first identifier and the another UE operating on the wireless telecommunication network;

mapping the multiple identifiers to the unique identifier associated with the home device;

receiving an indication of an outgoing communication associated with the home device, wherein the outgoing communication indicates a receiver including the second UE;

requesting a particular identifier among the multiple identifiers associated with the home device and associated with the outgoing communication;

receiving an indication of the particular identifier from the home device; and establishing a connection between the particular identifier, the home device, and the receiver including the second UE.

11. The method of claim 8, comprising:

storing a physical address and the unique identifier associated with the home device;

receiving an enhanced 911 call from the home device to an enhanced 911 operator; and sharing the physical address with the enhanced 911 operator.

12. The method of claim 8, comprising:

receiving the first protocol message through the first connection, wherein the first protocol message is encoded using a first codec, wherein the home device is configured to encode an audio into the first codec;

converting the first protocol message encoded using the first codec into a second protocol message using a second codec, wherein the multimedia subsystem is configured to decode the second codec;

sending the second protocol message using the second codec to the multimedia subsystem;

receiving another second protocol message through the second connection, wherein the other second protocol message is encoded using the second codec;

converting the other second protocol message encoded using the second codec into another first protocol message using the first codec; and sending the other first protocol message using the first codec to the home device.

13. The method of claim 8, comprising:

receiving, from the second UE, an indication of a request for communication with the first UE;

causing the first UE and the home device to generate a notification of the request for communication to the user;

determining that the user accepted the request for communication at one of the first UE or the home device; and upon determining that the user accepted the request for communication at one of the first UE or the home device, causing the first UE and the home device to stop generating the notification of the request for communication.

14. A system comprising:

at least one hardware processor; and at least one non-transitory memory storing instructions, which, when executed by the at least one hardware processor, cause the system to:

obtain a unique identifier associated with a home device and a unique identifier associated with a first UE of a user;

obtain an identifier associated with the first UE of the user, wherein the identifier enables a wireless telecommunication network to establish a call between the first UE of the user and another UE operating on the wireless telecommunication network;

map the identifier associated with the first UE of the user to the unique identifier associated with the home device and to the unique identifier associated with the first UE of the user;

receive a request for a communication between the identifier associated with the first UE of the user and a second UE;

initiate a first connection between the home device associated with the identifier and a translation gateway associated with the wireless telecommunication network and a second connection between the translation gateway and a multimedia subsystem associated with the wireless telecommunication network; and enable the home device to operate on the wireless telecommunication network and interact with the second UE associated with the wireless telecommunication network by:

receiving a first protocol message associated with a first protocol through the first connection or a second protocol message associated with a second protocol through the second connection, wherein the first protocol and the second protocol are different protocols; and translating the first protocol message into a particular second protocol message prior to sending the second protocol message to the multimedia subsystem, or translating the second protocol message into a particular first protocol message prior to sending the particular first protocol message to the home device.

15. The system of claim 14, comprising instructions to:

obtain multiple unique identifiers associated with multiple UEs;

obtain multiple identifiers associated with the multiple UEs, wherein a first identifier among the multiple identifiers enables the wireless telecommunication network to establish a call between a first UE associated with the first identifier and the another UE operating on the wireless telecommunication network;

map the multiple identifiers to the unique identifier associated with the home device;

receive an indication of an incoming communication associated with the first identifier among the multiple identifiers; and cause the home device and the first UE to produce a notification of the incoming communication.

16. The system of claim 14, comprising instructions to:

obtain multiple unique identifiers associated with multiple UEs;

obtain multiple identifiers associated with the multiple UEs, wherein a first identifier among the multiple identifiers enables the wireless telecommunication network to establish a call between a first UE associated with the first identifier and the another UE operating on the wireless telecommunication network;

map the multiple identifiers to the unique identifier associated with the home device;

receive an indication of an outgoing communication associated with the home device, wherein the outgoing communication indicates a receiver including the second UE;

request a particular identifier among the multiple identifiers associated with the home device and associated with the outgoing communication;

receive an indication of the particular identifier from the home device; and establish a connection between the particular identifier, the home device, and the receiver including the second UE.

17. The system of claim 14, comprising instructions to:

store a physical address and the unique identifier associated with the home device;

receive an enhanced 911 call from the home device to an enhanced 911 operator; and share the physical address with the enhanced 911 operator.

18. The system of claim 14, comprising instructions to:

receive the first protocol message through the first connection, wherein the first protocol message is encoded using a first codec, wherein the home device is configured to encode an audio into the first codec;

convert the first protocol message encoded using the first codec into the second protocol message using a second codec, wherein the multimedia subsystem is configured to decode the second codec;

send the second protocol message using the second codec to the multimedia subsystem;

receive another second protocol message through the second connection, wherein the other second protocol message is encoded using the second codec;

convert the other second protocol message encoded using the second codec into another first protocol message using the first codec; and send the other first protocol message using the first codec to the home device.

19. The system of claim 14, comprising instructions to:

receive, from the second UE, an indication of a request for communication with the first UE;

cause the first UE and the home device to generate a notification of the request for communication to the user;

determine that the user accepted the request for communication at one of the first UE or the home device; and upon determining that the user accepted the request for communication at one of the first UE or the home device, cause the first UE and the home device to stop generating the notification of the request for communication.

20. The system of claim 14, comprising instructions to:

receive a voice instruction to initiate the communication associated with the first UE of the user and the second UE, wherein the communication is between the home device and the second UE;

generate an indication of the communication requested by the identifier associated with the first UE;

send the indication of the communication including the identifier associated with the first UE to the second UE;

receive, from the second UE, an indication of an acceptance of the communication; and establish a connection between the home device and the second UE, wherein the second UE is configured to indicate that the connection is associated with the identifier associated with the first UE.

* * * * *